United States Patent [19]

Hsiu

[11] Patent Number: 5,163,741

[45] Date of Patent: Nov. 17, 1992

[54] DEVICE FOR HYDRAULIC BRAKE LOCK VALVE WITH A CLOSING PISTON

[76] Inventor: Chuan H. Hsiu, No. 30, Alley 44, Lane 291, Sec. 5, Nan King E. Rd., Taipei, Taiwan

[21] Appl. No.: 699,716

[22] Filed: May 14, 1991

[51] Int. Cl.⁵ .................. B60T 11/00; B60T 17/16
[52] U.S. Cl. ............................ 303/89; 188/353; 137/523
[58] Field of Search .............. 303/89; 188/265, 353; 180/287; 137/523; 251/248, 274

[56] References Cited

U.S. PATENT DOCUMENTS

| | | | |
|---|---|---|---|
| 2,285,781 | 6/1942 | Patrick | 188/353 |
| 2,345,280 | 3/1944 | Morgan et al. | 188/353 X |
| 2,964,141 | 12/1960 | Schlumbrecht | 188/265 X |
| 4,543,984 | 10/1985 | Murray | 303/89 X |
| 4,652,059 | 3/1987 | Wittich | 303/89 |
| 4,925,252 | 5/1990 | Hee | 303/89 |
| 4,951,776 | 8/1990 | Jeter | 188/353 X |

FOREIGN PATENT DOCUMENTS 1324236  7/1973  United Kingdom ........... 303/89

*Primary Examiner*—Robert J. Oberleitner
*Assistant Examiner*—Josie A. Ballato
*Attorney, Agent, or Firm*—Bacon & Thomas

[57] ABSTRACT

An apparatus for actuating a hydraulic brake has a housing with a cavity communicating with an input and an output for hydraulic fluid. The housing is adapted to be positioned between a master cylinder and a wheel cylinder in a vehicle hydraulic brake system. The cavity receives a valve apparatus in the form of a sleeve and a piston for opening and closing to control a flow of hydraulic fluid. The cavity also receives a seat, and the seat movably receives a transmission assembly that communicates with the valve apparatus. A driving system drives the transmission assembly to actuate the valve apparatus. A control circuit receives a code from a user to activate the driving system. A measuring device determines a duration of activation of the driving system. The valve is open during normal operation of the vehicle. To lock the brakes for security, the code is entered and if correct, the valve closes, thereby acting as a check valve. Hydraulic medium is forced through the valve to the wheel cylinders. The hydraulic medium is prevented from flowing back through the valve, thereby locking the brakes.

12 Claims, 6 Drawing Sheets

DEVICE FOR HYDRAULIC BRAKE LOCK VALVE WITH A CLOSING PISTON

BACKGROUND OF THE INVENTION

The present invention relates to a device for actuating a hydraulic brake of a vehicle. The present invention, employing a piston instead of a ball, can be used to lock the brake system of a vehicle for anti-theft purposes and for preventing the vehicle from rolling down when parked on a slope.

At the present, anti-theft systems can be roughly divided into two types: alarm systems and hydraulic lock systems. The former employs only an alarm trying to threaten away a would-be thief but, very often, in vain. The latter, co-operating with the hydraulic brake system of the vehicle, can lock the brakes to protect the car from being moved. Therefore, a hydraulic lock system which co-operates with a hydraulic brake system is the most effective anti-theft system.

Conventionally, hydraulic lock systems can be divided into electromagnetic valve-type systems and ball valve-type systems. In the electromagnetic valve type systems, an electromagnetic valve, being electrically connected to a circuit, communicates with a pipe of the hydraulic brake system. Depending on whether a current is directed through the circuit, the valve is closed thus preventing a hydraulic medium from flowing through the pipe so that the brake is locked.

A first problem of the electromagnetic valve-type systems is that the circuit can be easily cut off, thus opening the valve, so that the brake is released. As a result, electromagnetic valve-type anti-theft systems can be easily broken through. A second problem of these systems is that, if the circuit malfunctions while driving, the brakes would be suddenly locked and the vehicle is stopped instantly so that the driver might be badly hurt and the vehicle might be seriously damaged if being hit by a vehicle following. Accordingly, improvements are needed.

In the ball valve-type systems, a ball valve, including a housing formed with a plurality of through holes and a ball therein formed with a plurality of channels, communicates with a pipe of the hydraulic brake system. The ball is rotatable, so that the valve is opened or closed depending on an alignment between the holes and the channels.

A first problem of the ball valve-type systems is that the ball is easily worn out by a friction between the housing and the ball, thus increasing a clearance between the housing and the ball thus the hydraulic medium is apt to leak out of the valve. As a result, the hydraulic brake system does not function properly.

SUMMARY OF THE INVENTION

It is an object of the present invention to provide a valve which communicates with a pipe of a hydraulic brake system.

It is another object of the present invention to provide a valve which includes a piston for closing the valve.

These and additional objects, if not set forth specifically herein, will be readily apparent to those skilled in the art from the detailed description of embodiments below, with reference of the accompanying drawings.

DESCRIPTION OF THE INVENTION

For a general understanding of a conventional brake system of an automobile on which the present invention in employed, the following provides a brief outline. A hydraulic brake system has a reservoir for storing hydraulic media which communicates with a master cylinder which further communicates with four wheel cylinders for operating a hydraulic brake of each wheel. When the brake pedal is depressed, hydraulic medium is pumped by the master cylinder from the reservoir to each wheel cylinder in order to actuate each brake. When the brake pedal is released, the hydraulic medium is urged from each wheel cylinder back to the reservoir, thereby releasing the wheel. If the hydraulic medium is maintained in each wheel cylinder, each brake remains locked, thereby locking each wheel.

Figure 1:
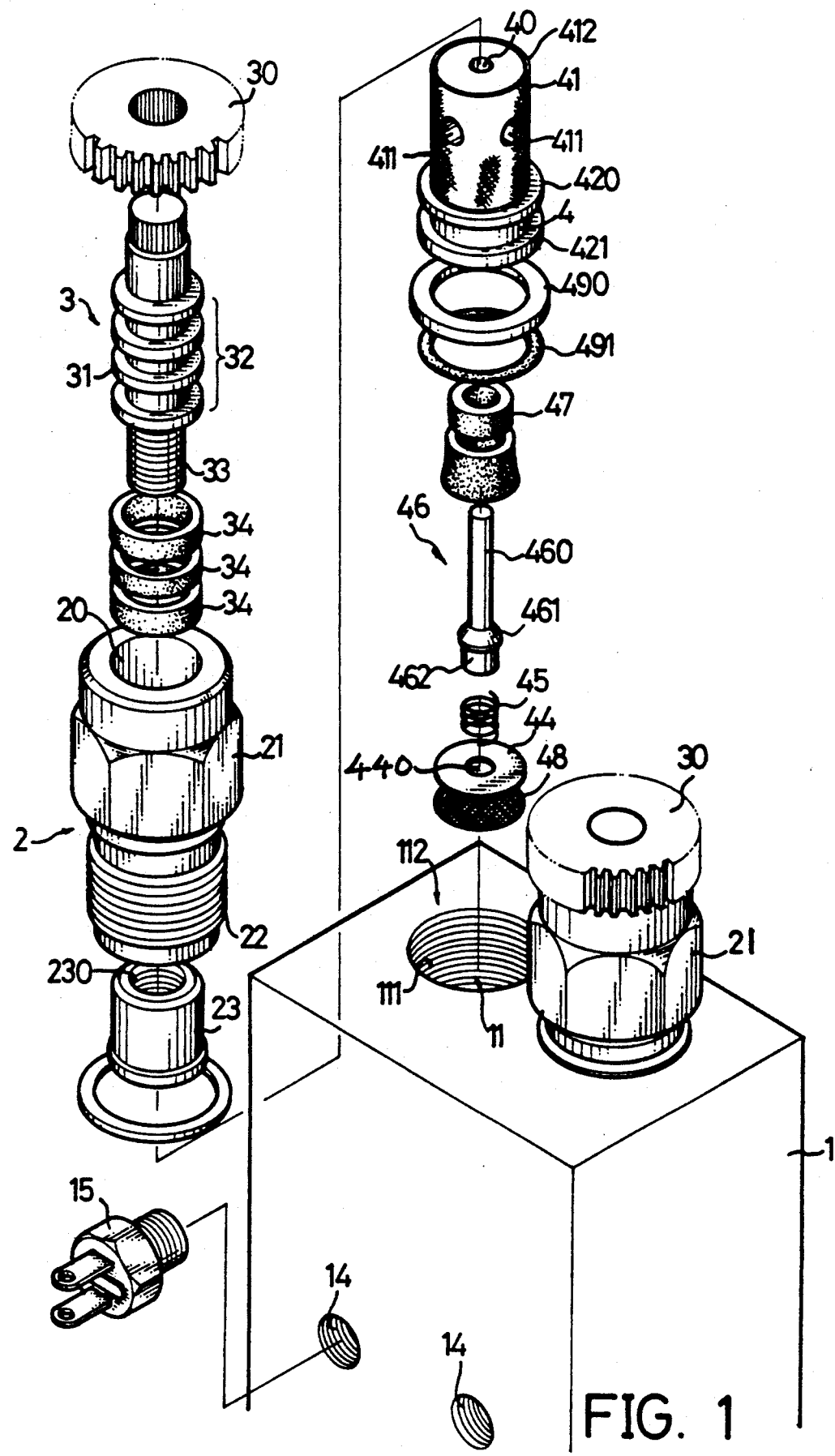
FIG. 1 is a perspective exploded view of a valve in accordance with the present invention.
Figure 2:
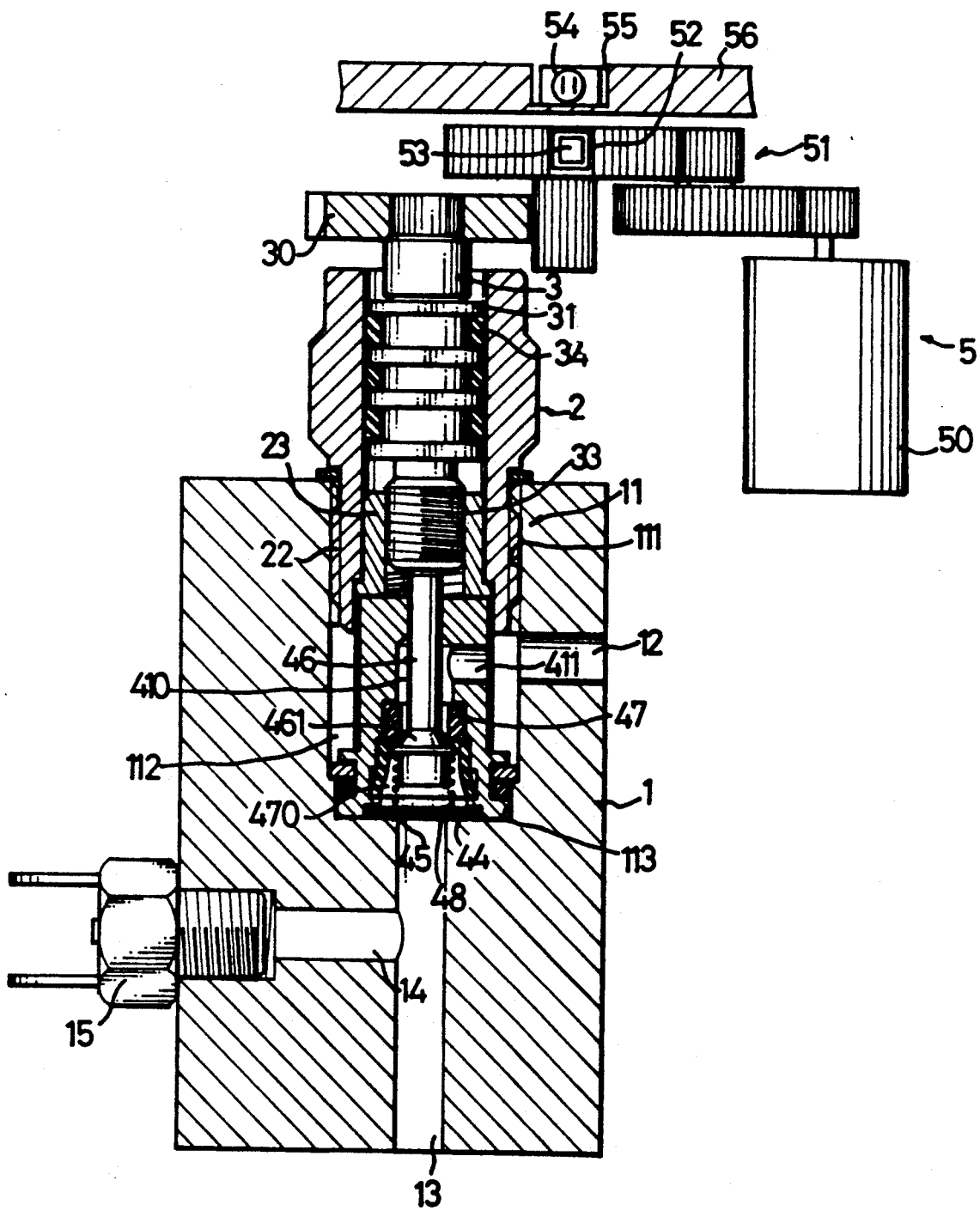
FIG. 2 is a cross-sectional view of the valve according to the present invention operatively connected to a driving assembly.

Referring to FIGS. 1 and 2, a valve includes a housing 1 having at least one cylindrical cavity 11. The housing 1 is adapted to be positioned between the master cylinder and the wheel cylinders of a vehicle brake system. The cylindrical cavity 11 includes an opening, a wall 110, and a bottom. The wall of the cylindrical cavity 11 includes a threaded first portion 111 adjacent to the opening of the cylindrical cavity 11, a second portion 112 having a diameter the same as that of the threaded first portion 111, and a third portion 113 having a diameter smaller than that of the threaded first portion 111 and being adjacent to the bottom of the cavity 11. An input channel 12, having a diameter smaller than that of the third portion 113, leads from a hydraulic pipe within which a hydraulic medium flows and transversely communicates with the cavity 11 through the second portion 112. An output channel 13, having a diameter the same as that of the input channel 12, co-axially communicates with the cavity 11. A pressure channel 14 has a first end transversely communicating with the output channel 13 and a second end. A pressure gauge 15 is attachable to a second end of the pressure channel 14, so that pressure of the hydraulic medium flowing therethrough can be measured thereby.

A sleeve 4 includes a top having a hole 40, a periphery 41 defining a chamber 410 therein and having a plurality of holes 411 therethrough, a filter 412 tightly enclosing the periphery 41 thus covering the holes 411, and two spaced flanges 420 and 421 extending around the periphery 41. A piston 46 is received in chamber 410 and includes a first portion 460 being insertable through the hole 40, a conical second portion 461 being co-axially fixed thereto, and a third portion 462 having a diameter larger than that of the first portion 460 and being co-axially and discretely fixed thereto. A conformable tubular element 47 defining a channel 470 is received in chamber 410. A spring 45 encases the third portion 462 of piston 46. A washer 44 with a central hole 440 is disposed at the bottom of chamber 410. A filter 48 abuts the washer 44. A flexible ring 490 and a flexible ring 491 fit around the periphery 41 between the flanges 420 and 421 with the flexible ring 490 resting above the ring 491.

Then, the sleeve 4 is received in the cavity 11. The filter 48 rests on the bottom of the cavity 11, thereby covering the output channel 13. The washer 44 rests on the filter 48, so that the hole 440 aligns with the output channel 13. The spring 45 is disposed between and biased by the second portion 461 and the washer 44. Sleeve 4 is inserted in housing 1 with flexible ring 490 engaging the second portion 112 while the flexible ring 491 touches the third portion 113, so that a hydraulic medium is restrained from leaking downward.

A hollow seat 2, defining a channel 20, includes a hexangular portion 21 and a threaded portion 22 fixed therebelow for engaging with the threaded portion 111, thus securing the element 2 onto the housing 1. An element 23 formed with a threaded channel 230 is fixedly received in the channel 20.

A transmission assembly 3 includes a gear 30, a rod 31 defining a first end fixed thereto, a plurality of spaced flanges 32 and a threaded second end 33, and a plurality of flexible sealing rings 34 each being respectively disposed between two adjacent flanges 32.

In assembly, the threaded portion 22 engages with the threaded portion 111, thus securing the element 2 to the housing 1, while abutting the element 23 against the top of the sleeve 4, so that the sleeve 4 is fixed in position.

The transmission assembly 3 is then inserted through the channel 20. The gear 30 in fixed to a top end of a rod 31, and the threaded end 33 engages with the threaded channel 230, whereby when the gear 30 rotates in a respective direction, the rod 31 with the threaded end 33 rotates likewise, thereby being respectively drawn downward or upward in the element 23 due to the threaded engagement, thereby respectively urging the piston 46 downward (opening the valve) or allowing the piston 46 upward movement due to the spring 45 (closing the valve, with the flexible rings 34 seals the channel 20.

A driving assembly 5 includes a motor 50, a reduction gear assembly 51 operatively connecting with the gear assembly 51. The motor operatively co-operates with the gear 30 through a reduction gear assembly 51. The gear assembly 51 includes a gear 52 and a magnetic element 53 embedded in the gear 52. A magnetic sensor 54 resting in a groove 55 of a shelf 56 is arranged such that it sends out a signal every time the magnetic element 53 passes by.

Figure 3:
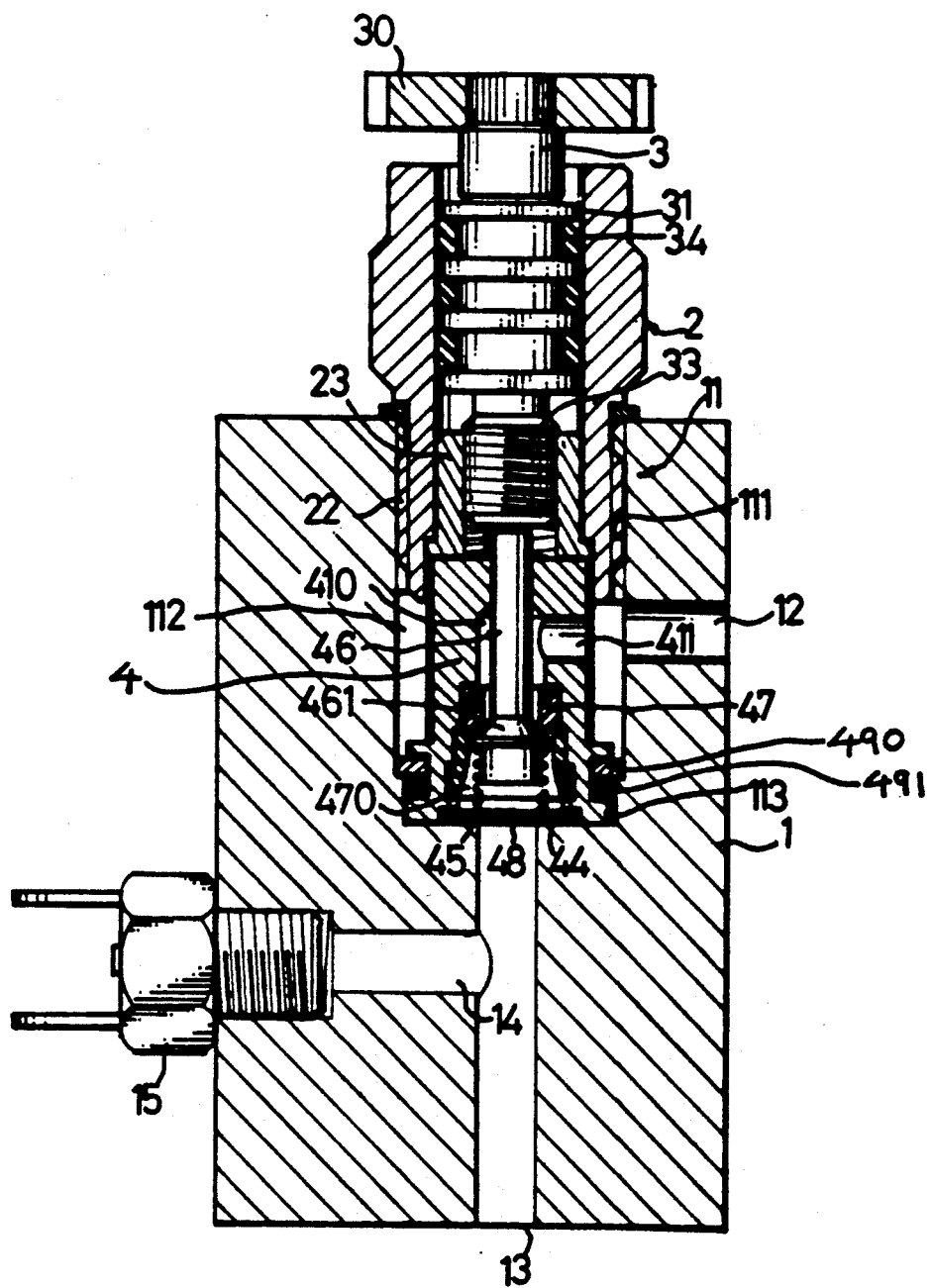
FIG. 3 is a cross-sectional view of the valve according to the present invention in a closed position.

Referring to FIG. 3, the rod 30 is shown in a top dead position where the piston 46 is biased upwardly by the spring 45, so that the conical portion 461 tightly seals the channel 470. Under this condition, the hydraulic medium is allowed to flow from the input channel 12 to the output channel 13 but is prevented from flowing from the output channel 13 to the input channel 12 i.e., the valve acts as a check valve.

Figure 4:
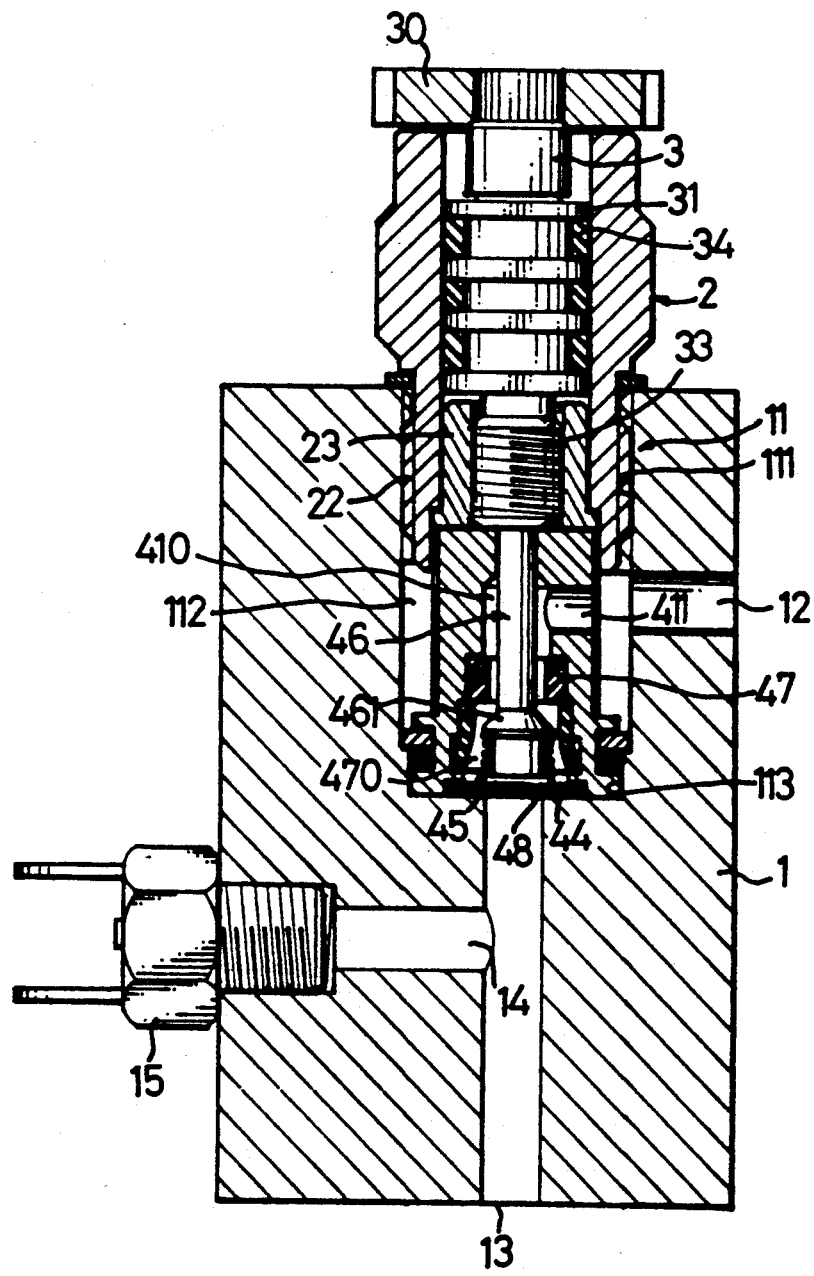
FIG. 4 is a cross-sectional view of the valve according to the present invention in an opened position.

Referring to FIG. 4, the rod 31 is shown in a bottom dead position where the piston 46 is pushed downwardly, so that the conical portion 461 disengages from the conformable tubular element 47 and thereby opens the channel 470, thus allowing the hydraulic medium to flow therethrough. As a result, the brake of the vehicle is released.

The rod 31 is driven from the top position thereof to the bottom dead position thereof through a pre-determined number of revolutions of the gear 52, and vice versa.

Figure 5:
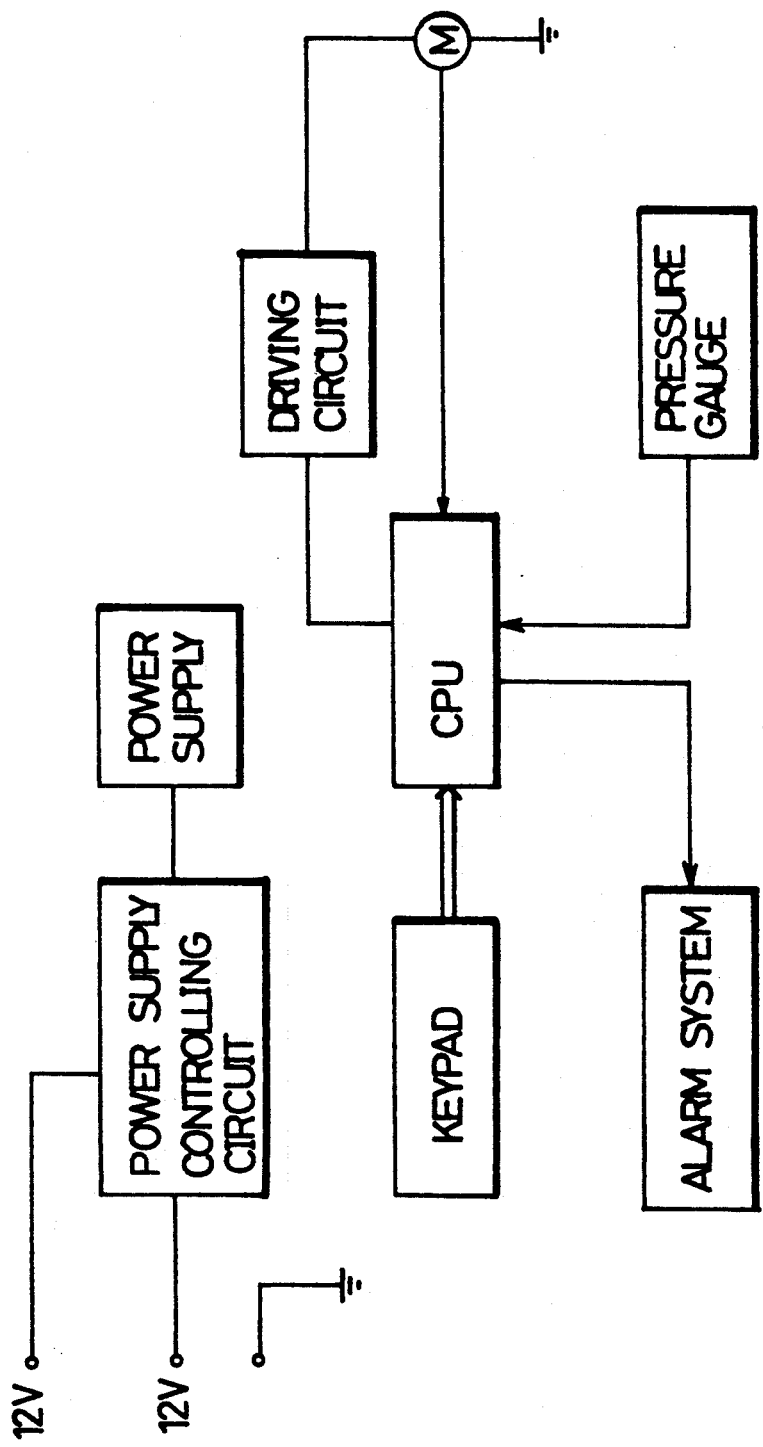
FIG. 5 is a flow chart of a control circuit according to the present application.

Referring to FIG. 5, a control circuit is used to cooperate with the valve. The control circuit comprises a power supply communicating with two 12-volt leads through a power supply control circuit, a central processing unit (CPU), a keypad communicating with the CPU, an alarm system communicating with the CPU, a driving circuit communicating with the CPU, a pressure gauge communicating with the central process unit.

First, to lock the brake, a set of codes is given to the CPU. If the given code is identified to be correct, the CPU then actuates the motor 50 to rotate the gear 52 to draw the rod 31 upward so that the spring 45 urges the piston 46 upward and the conical portion 460 contacts the tubular elements 47 magnetic element 53 passes by the magnetic sensor 54, the magnetic sensor 54 detects it and sends out a signal to the CPU, thereby the CPU calculates how many revolutions the gear 52 has rotated. After a pre-determined number of revolutions have been completed, the CPU instructs the motor 50 to stop, readying the member 50 to rotate reversely. At this point hydraulic medium is forced through the valve, the hydraulic force overcoming the compression force of the spring 45, thereby urging the piston 46 downward. To unlock the brakes, a correct code must be entered for the above-described process to be reversed, allowing hydraulic medium within the wheel cylinders to flow back to the reservoir. If the hydraulic medium leaks out of the brake system and the pressure between the valve and the wheel cylinders therefor; and decreases, a signal is sent to the CPU from pressure gauge 15. The CPU then actuates the alarm system to warn the driver that there is a leakage.

Figure 6:
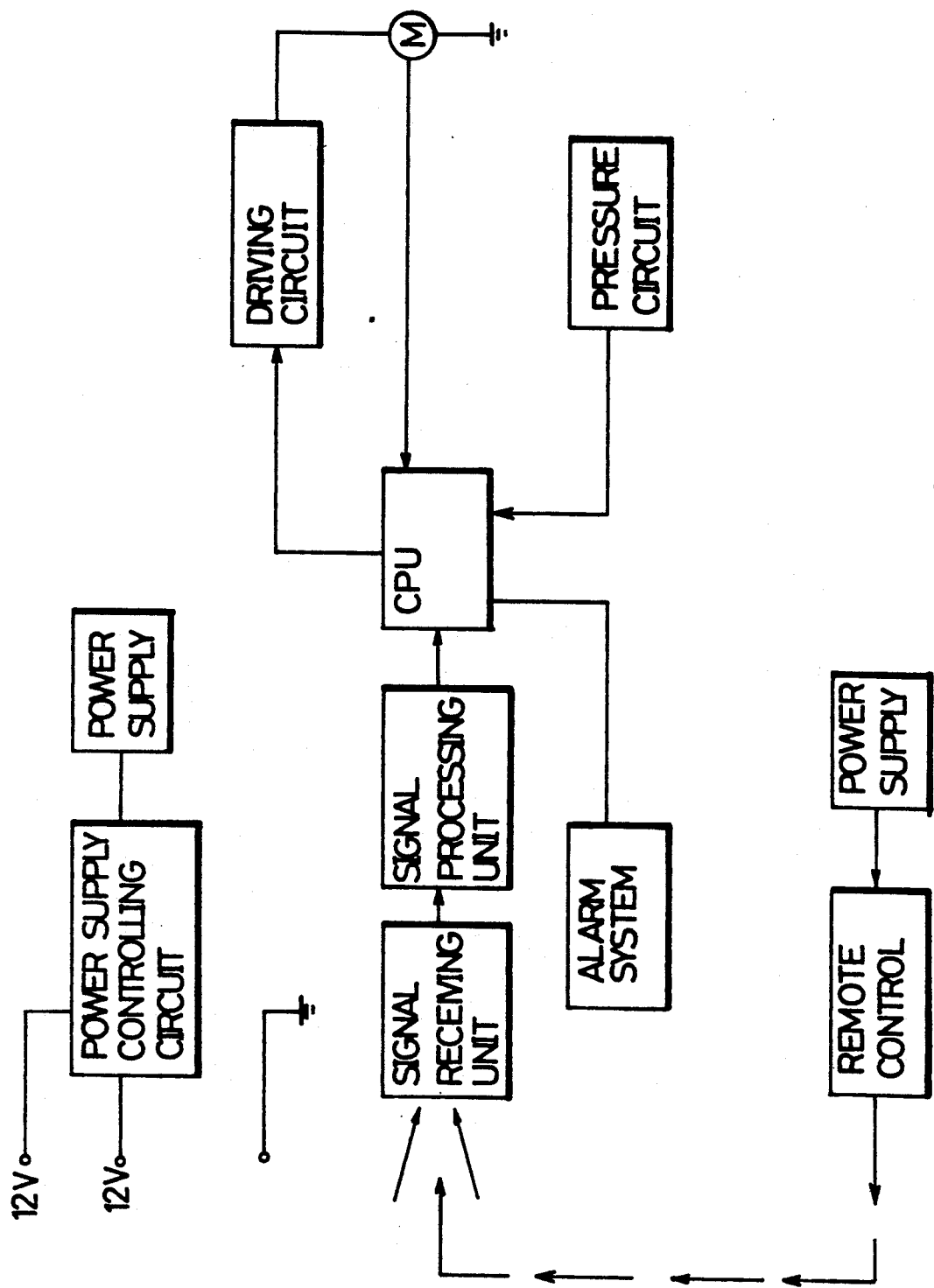
FIG. 6 is a flow chart of another control circuit according to the present application.

Referring to FIG. 6, a remote control substitutes for the keypad as shown in FIG. 5. The remaining elements function identically as the corresponding elements shown in FIG. 5.

While the present invention has been explained in relation to its preferred embodiment, it is to be understood that various variations thereof will be apparent to those skilled in the art upon reading this specification. Therefore, the invention disclosed herein is intended to cover all such variations as shall fall within the scope of the appended claims.

What I claim is:

1. A device for maintaining a hydraulic media in at least one wheel cylinder of a vehicle hydraulic brake system, thereby locking the wheel, comprising:

a housing having a cavity formed therein, an input channel formed therethrough in fluid communication with said cavity and adapted to be in fluid communication with a master cylinder of the brake system, and an output channel formed therethrough communicating with said cavity and adapted to be in fluid communication with said at least one vehicle wheel cylinder;

a hollow seat member being releasably secured in an external end of said cavity;

valve means being received in said cavity for controlling a flow of hydraulic fluid from said output channel to said input channel, said valve means comprising:

(a) a sleeve adapted to be received in said cavity and having at least one hole extending from within said sleeve through the periphery thereof, a hole formed in a first end thereof, and a pair of peripheral flanges formed, in a spaced relationship about a second end thereof, said flanges being adapted to secure said sleeve within said cavity;

(b) a seal extending about said sleeve between said flanges, (c) piston means slidably received in the hole formed in the first end of said sleeve, said piston means including a conical portion adjacent one end thereof, (d) sealing means, mounted within said sleeve, for creating a seal between the conical portion of said piston means and said sleeve, said sealing means conforming to the inner geometry of said sleeve, and (e) spring means acting between said piston means and said cavity for biasing said conical portion into engagement with said sealing means;

transmission means including a seal member and a rod rotatably received within said seat member, said rod including a threaded end portion and at least one pair of flanges formed around an outer periphery thereof, said seal member being disposed between said pair of flanges and extending between said rod and said seat member;

means for coupling said valve means and said transmission means, said coupling means being mounted within said seat member and comprising an internally threaded tubular element for threadably receiving the threaded end portion of said rod, said transmission and coupling means being arranged such that rotation of said rod in a predetermined direction results in shifting of said piston means against the biasing force of said spring means such that the conical portion of said piston means becomes disengaged from said sealing means and rotation of said rod in an opposite direction results in shifting of said piston means such that the conical portion is seated against said sealing means;

means for rotatably driving said transmission means; and control means being linked to said driving means for activating said driving means in response to receiving a predetermined code signal;

whereby under normal conditions the conical portion of said piston means is disengaged from said sealing means such that a hydraulic media is permitted to flow from said input channel to said output channel and vice versa, and when said driving means is activated by said control circuit to rotate said transmission means, said piston means is shifted, through the threaded connection between said rod and said coupling means, until the conical portion of said piston means is seated against said sealing means, at which time, said control circuit deactivates said driving means, hydraulic media is permitted to flow from said input channel to said output channel under pressure by shifting said piston means against the biasing force of said spring means so as to disengage the conical portion of said piston means from said sealing means but is prevented from flowing from said output channel to said input channel.

2. A device as claimed in claim 1, wherein the tubular element of said coupling means is fixedly mounted within said seat member and, upon rotation of said transmission means, the rod of said transmission means is shifted relative to said seat member and said tubular element through the threaded connection such that said rod enables shifting of said piston means relative to said sealing means.

3. A device as claimed in claim 2, wherein said driving means comprises a motor, a rotatable gear assembly drivingly connected to said motor, and a linking means for linking said gear assembly with said transmission means.

4. A device as claimed in claim 3, further comprising measuring means for counting the number of revolutions of said gear assembly and outputting a signal to said control means for use in controlling the deactivation of said motor.

5. A device as claimed in claim 3, further comprising a first filter disposed about the periphery of said sleeve.

6. A device as claimed in claim 5, further comprising a second filter mounted in said cavity at said output channel.

7. A device as claimed in claim 6, further comprising a washer located between said second filter and said sleeve within said cavity.

8. A device as claimed in claim 1, wherein said sleeve has a diameter less than that of said cavity, thereby defining a reservoir between an outer periphery of said sleeve and an inner periphery of said cavity, said reservoir being in open fluid communication with said input channel.

9. A device as claimed in claim 1, wherein said control means comprises a user interface for receiving an input code from a user and a central processing unit for receiving said input code and determining if said input code matches said predetermined code.

10. A device as claimed in claim 9, wherein said user interface is a keypad.

11. A device as claimed in claim 9, wherein said user interface is a remote control unit.

12. A device as claimed in claim 1, wherein said housing further comprises a pressure channel formed therein in fluid communication with said output channel, and a pressure gauge for measuring the pressure in said pressure channel.

* * * * *